United States Patent [19]
Volodarskaya et al.

[11] 3,804,611
[45] Apr. 16, 1974

[54] SELECTIVE S-TRIAZINE HERBICIDES

[76] Inventors: Nadezhda Antonovna Volodarskaya, Turistskaya ulitsa, 8, kv. 117, Moscow; Jury Veniaminovich Scheglov, Odintsovsky raion, p/o B. Vyazemy, Institut, 5, kv. 4, Moskovskaya oblast; Irida Alexandrovna Melnikova, Schelkovskoe shosse, 56/72, kv. 10, Moscow; Nikolai Nikolaevich Melnikov, ulitsa D. Ulyanova, 4, korpus A, kv. 96, Moscow; Jury Alexandrovich Baskakov, ulitsa D. Ulyanova, 4, korpus B, kv. 233, Moscow; Leonid Dmitrievich Stonov, Lavrushensky pereulok 17, kv. 21, Moscow; Ljudmila Alexandrovna Bakumenko, ulitsa Gorkogo, 54, kv. 86, Moscow; Asya Mikhailovna Grabovskaya, Sporny pereulok, 5, Ljubertsky Moskovskoi oblasti; Valentina Grigorievna Kazakova, Beskudnikovsky bulvar, 25, korpus 3, kv. 30, Moscow, all of U.S.S.R.

[22] Filed: Dec. 2, 1970

[21] Appl. No.: 94,607

[52] U.S. Cl. .................................. 71/93, 260/249.8
[51] Int. Cl. ............................................. A01n 9/22
[58] Field of Search ............ 71/93; 260/249.6, 249.8

[56] References Cited
UNITED STATES PATENTS

| | | | |
|---|---|---|---|
| 3,505,322 | 4/1970 | Shaw | 260/249.6 |
| 3,505,326 | 4/1970 | Shaw | 260/249.6 |
| 3,364,215 | 1/1968 | Hackmann et al. | 260/249.8 |

FOREIGN PATENTS OR APPLICATIONS

| | | | |
|---|---|---|---|
| 1,135,848 | 12/1956 | France | 71/93 |

*Primary Examiner*—James O. Thomas, Jr.
*Attorney, Agent, or Firm*—Holman & Stern

[57] ABSTRACT

Selective s-triazine herbicides for controlling grassy and dicotyledonous weeds in sowings of farm crops, for example, cotton plant, tomatoes, potato, beat, cabbage and other vegetable crops, in which an active agent is 2-(alkoxy-or alkylthio-)-4-alkylamino-6-N-alkylhydroxylamino-s-triazine of the general formula

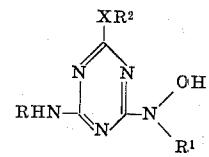

where: R is alkyl with a number of carbon atoms equal to one to five, X is oxygen or sulphur; if X is oxygen and $R^2$ is methyl, then $R^1$ is hydrogen or alkyl with a number of carbon atoms equal to two to four; if X is oxygen and $R^2$ is ethyl, then $R^1$ is hydrogen or alkyl with one to four carbon atoms; if X is sulphur, $R^1$ is hydrogen or alkyl with one to three carbon atoms, then $R^2$ is methyl, ethyl.

5 Claims, No Drawings

SELECTIVE S-TRIAZINE HERBICIDES

The present invention relates to methods of weed control through the use of herbicide preparations selectively destroying grass and dicotyledonous weeds in sowings of farm crop, particularly, cotton plant, tomatoes, potato, beet, cabbage gourd family, millet, parsley, etc.

Widely used herbicides are amino-derivatives of s-triazine namely, simazine [2-chloro-4,6-bis-(ethylamino)-s-triazine], atrazine (2-chloro-4-ethylamino)-6-isopropylamino-s-triazine), prometrine [2-methylthio-4,6-bis-(isopropylamino)-s-triazine], etc.

These s-triazine herbicides have significant disadvantages.

Simazine and atrazine at soil application keep phytotoxic properties for long periods (up to 2–3 years) and deteriorate sowings of crops sensitive to herbicides and planted some years after the application of these herbicides. In addition, atrazine and prometrine have poor selective properties and can be used only on a limited range of cultivated plants.

The assortment of the triazine herbicides available does not meet the demands of agricultural production.

An object of the present invention is to improve the herbicide properties of the triazine herbicides (selectivity, higher solubility, absence of long-term after-effects and to widen the range of the herbicide assortment.

This object has been attained due to application as selective herbicides of 2-(alkyloxy-or alkylthio-)-4-alkylamino-6-N-alkylhydroxylamino-s-triazines having the general formula:

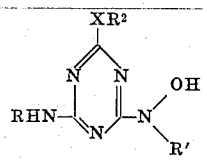

(I)

where R is alkyl with one to five carbon atoms, X is oxygen or sulphur: if X is oxygen and $R^2$ is methyl, then $R^1$ is hydrogen, alkyl with two to four carbon atoms; if X is oxygen and $R^2$ is ethyl, then $R^1$ is hydrogen, or alkyl with one to four carbon atoms; if X is sulphur, $R^1$ is hydrogen or alkyl with two to three carbon atoms, then $R^2$ is methyl, ethyl.

Examples of the above-said compounds are as follows.

2-methylthio-4-isopropylamino-6-hydroxylamino-s-triazine (II);

2-methylthio-4-isopropylamino-6-N-methylhydroxylamino-s-triazine (III);

2-methylthio-4-N-propylamino-6-N-methylhydroxylamino-s-triazine (IV);

2-ethylthio-4-isopropylamino-6-N-isopropylhydroxylamino-s-triazine (V);

2-methoxy-4-isopropylamino-6-hydroxylamino-s-triazine (VI);

2-methoxy-4-ethylamino-6-N-ethylhydroxylamino-s-triazine (VII);

2-methoxy-4-isopropylamino-6-N-ethylhydroxylamino-s-triazine (VII);

2-methoxy-4-ethylamino-6-N-isopropylhydroxylamino-s-triazine (IX);

2-methoxy-4-isopropylamino-6-N-isopropylhydroxylamino-s-triazine (X);

2-ethoxy-4-isopropylamino-6-N-n-butylhydroxylamino-s-triazine (XI);

2-methoxy-4-ethylamino-6-N-n-butylhydroxylamino-s-triazine (XII);

2-methoxy-4-methylamino-6-N-isopropylhydroxylamino-s-triazine (XIII);

2-ethoxy-4-methylamino-6-N-n-amylamino-s-triazine (XIV);

2-methoxy-4-isoamylamino-6-N-ethylhydroxylamino-s-triazine (XV).

Compounds III, IX and X are the most interesting ones from the proposed group of the compounds.

They are capable of destroying a number of resistant grass weeds [for example wild oats (Avena fatua L.), barnyard grass (Echinochloa crusgallis)] and dicotyledonous weeds [for example white goosefoot (Chenopodium album), amaranth, (Amaranthus spp.), matricary (Matricaria spp.), knotweed (Polygonum lapathifolium L.),field pennycress (Thlapsi arventse L.), corn spurry (Spergula arvensis L.),wild buckweat (Polygonum convolvulus L.), etc] in sowings of cultivated plants and have the following advantages as compared with the known triazine herbicides (atrazine, propazine, prometrine): compound III — a shorter duration of toxic after-effect, good solubility in water at pH $\geq$ 8 so that it can be used in the form of water-soluble aminosalts; an original selectivity — when used in the vegetation in an effective dose of 2 kg/ha the preparation is harmless for potato, garden radish, sorghum, seed carrot, parsley, celery, mustard, cotton plant; at preemergence application it is harmless for beet, cucumbers, dill; at all terms of cultivation it is harmless for tomatoes, cabbage, or gourd family, for example, melon. It should be noted, that cotton plant is stable to the action of the proposed herbicide, while it is usually very sensitive to the s-triazine herbicides used nowadays. Tomatoes are also very stable to the action of the proposed herbicides, whereas they can be treated only by a few preparations which are not derivatives of triazine.

In addition to the above-mentioned advantages, compounds IX and X provide for a possibility of postemergence application on a cotton plants field in doses of 1 kg per ha and less, while the presently known cotton preparations, namely, catorane, trephlane, etc. are soil-effect herbicides.

The compounds of formula I, which have been first synthesized by the inventors (see Chemistry of Heterocyclic Compounds, 70(5),697–701, are heat-resistant compounds capable of being distilled under a high vacuum. Some of them consist of yellowish viscous oils liable to crystallization after a longterm storage, others are white crystalline compounds having a melting point within the range of 50°–200°C. These compounds are quite soluble in low-molecular alcohols, dimethylformamide, acetone, dimethylsulphoxide, diluted alkali and are isolated in a pure state when acidified to pH= 7. They are rather soluble in water and feature a poor solubility in hydrocarbons and halohydrocarbons.

The synthesis of the compounds of formula I is effected by reacting corresponding chloroderivatives of s-triazine with N-alkylhydroxylamines according to the following diagram:

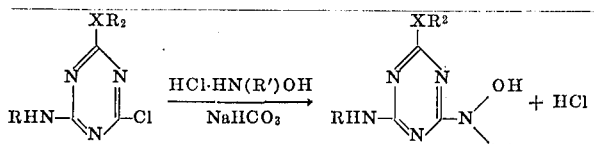

where X, R, R¹, R² have the above-stated significance.

The reaction was conducted in a water-dioxane medium at pH = 7–8 in a nitrogen flow with the use of 100 percent, excess of muriatic N-alkylhydroxylamine and a corresponding amount of sodium bicarbonate necessary for neutralization of chlorohydrate and hydrogen chloride released due to the reaction.

Under these conditions the reaction is completed at heating of the mixture up to 50°–80°C during 2 to 3 hours, the produced N-alkylhydroxylamine derivatives of s-triazine having rather a high yield.

The structure of the compounds of formula I has been confirmed by a comparative study of their infrared spectra.

The following example describes the synthesis in detail.

EXAMPLE I

The synthesis of 2-methylthio-4-isopropylamino-6-N-methylhydroxylamino-s-triazine 0.1 mole of muriatic N-methylhydroxylamine in 10 ml of water is neutralized in a flow of nitrogen by a solution of 0.1 mole of $NaHCO_3$ in 25 ml of water at a temperature of −10° to −5°C. Added simultaneously to the obtained solution is 0.5 mole of 2-methylthio-4-isopropylamino-6-chlor-s-triazine in 40 ml of dioxane and 0.2 mole of $NaHCO_3$ in 60 ml of water, in which case pH of the mixture is equal to 8. The reaction mixture is stirred during 2 hours at 55°–60°C and during 1 hour at 80°C. During the entire time of the reaction a nitrogen flow is passed through the mixture. After the heating, the solution is cooled down, water is added (one-half by volume) and the solution is acidified with hydrochloric or acetic acid to pH = 7, is saturated with common salt and is extracted with benzene or ether (3 times by 70 ml), the organic layer is dried over $MgSO_4$, is filtered out, and the mother solution is evaporated. The residue is cold-treated (acetone + $CO_2$) with anhydrous $(C_2H_5)_2O$ (≈5 ml) and the compound III is filtered out. An additional amount of compound III is isolated by means of multiple precipitation from the ester mother solution with the aid of light petroleum (the boiling point is 40°–60°C). The total yield of compound III is equal to 71 percent, the melting point is 90°–1°C.

It has been found in per cent: C 41.98, 42.14; H 6.89, 6.95; N 30.55, 30.23; $C_8H_{15}N_5OS$. It has been calculated in per cent: C 41.89, H 6.59, N 30.55.

The other derivatives of Formula I are produced in a similar way.

The study of the herbicide properties of the compound has been conducted under hothouse conditions. The results of the tests are described in the following Examples and shown in the Tables.

EXAMPLE 2

Hydroxylamine derivatives of s-triazine are dissolved in acetone, a fine layer of soil is treated with the solutions, is carefully mixed and placed into paper cups having a capacity of 300 ml. The sprouting seeds of bean, wheat and garden radish are shown after 24 hours. The above cultures are grown to a 10-day age and are sprayed with solutions of the above compounds in an alcohol-dioxane mixture (3 portions of 75 percent ethyl alcohol + 1 portion of dioxane). The doses of the compounds are 5 and 10 kg/ha, the test is repeated twice, the observation is effected within 30 days. The herbicide properties of the compounds are evaulated visually through a three-mark scale. In case of slight damage of the plants the preparation receives a single-score mark (+), at heavy damage of the plant -2-score mark (++) and in the case of complete desctruction of the plant the preparation receives a 3-score mark (+++). Identification +(+) means 1.5 mark, and identification ++(+) corresponds to 2.5 marks. The compounds which do not cause any noticeable damage of the plant are evaluated as inactive (0). The phytotoxicity of the tested compounds is compared with that of reference prometrine and atrazine. The results of the tests are given in Table 1.

The experiments have shown that the compounds given in Table 1, when either applied into soil before sowing or applied onto the vegetating plants, are high-toxicity herbicides close to the standards but have a better selectivity than that of the standards, the compounds with a metoxy-group in position 2 (compounds VI, VII, VIII) before being effective in soil application while the compounds with a methyl-thio group being substantially herbicides of postemergence application.

By the character of their action the above compounds are close to atrazine but the duration of this action is different. When applied into a soil, they cause detention in the growth of the plant during the first 5–7 days after the appearance of the sproutings, thereafter, they cause shrinkage of the leaf blades after the development of chlorosis. If the compounds are applied onto the plants, the leaf blades wilt and dry within the first few days after the treatment, Table I Herbicide activity of s-triazine derivatives

| Compound | Chemical title | Dose kg/ha | Herbicide activity of compounds | | | | | |
|---|---|---|---|---|---|---|---|---|
| | | | Soil application | | | Spraying of plants | | |
| | | | bean | wheat | garden radish | bean | wheat | garden radish |
| III | 2-methylthio-4-isopropyl- amino-6-N-methylhydroxyl- amino-s-triazine | 10 5 | +++ ++ | +++ +(+) | (+) 0 | ++(+) +(+) | ++(+) ++ | +++ +++ |
| VI | 2-methoxy-4-isopropylami- no-6-hydroxylamino- s-triazine | 10 5 | +++ +++ | +++ +(+) | +++ +(+) | ++ +(+) | ++ +(+) | ++ — |
| IV | 2-methylthio-4-n-propyl- amino-6-N-methylhydroxy- amino-s-triazine | 10 5 | + 0 | + 0 | 0 0 | ++ (+) | + 0 | ++ ++ |

Table I—Continued

Herbicide activity of s-triazine derivatives

| Compound | Chemical title | Dose kg/ha | Soil application | | | Spraying of plants | | |
|---|---|---|---|---|---|---|---|---|
| | | | bean | wheat | garden radish | bean | wheat | garden radish |
| II | 2-methylthio-4-isopropyl-amino-6-hydroxylamino-s-triazine | 10 | +++ | + | 0 | +(+) | ++ | ++ |
| | | 5 | +++ | 0 | 0 | +(+) | ++ | 0 |
| VII | 2-methoxy-4-ethylamino-6-ethyl-hydroxylamino-s-triazine | 10 | +++ | +++ | +++ | + | + | 0 |
| | | 5 | + | ++(+) | +(+) | (+) | (+) | 0 |
| VIII | 2-methoxy-4-isopropyl-amino-6-N-ethylhydroxylamino-s-triazine | 10 | +++ | +++ | ++ | ++(+) | ++ | +++ |
| | | 5 | +++ | +++ | ++ | ++(+) | +(+) | +++ |
| | Prometrine | 10 | +++ | +++ | +++ | +++ | +++ | +++ |
| | | 5 | +++ | +++ | +++ | +++ | +++ | +++ |
| | Atrazine | 10 | +++ | +++ | +++ | +++ | +++ | +++ |
| | | 5 | +++ | +++ | +++ | +++ | +++ | +++ | the leaves of bean fall off, and chlorosis and drying of the top of the whole plant take place.

As shown in Table 1, compounds III, VI, VII and, particularly, compound VIII have the highest herbicide activity.

EXAMPLE 3

The most active compounds enumerated in Example 2 are applied into soddy podzolic soil to be used for growing testplants thereon or are applied onto 10-day plants (as described in Example 2) in a dose of 2.5 kg/ha. The test-plants include bean, garden radish, sunflower, wheat, oats, and maize. The test is repeated five times the observation is effected within 30 days. The herbicide properties of the compounds are evaluated by a decrease in the weight of the green vegetable mass expressed in per cent to the control (Tables 2,3). On using the results of weighing the plants, a dosage reducing the plant weight for 50 percent ($ED_{50}$, Table 4) is determined by the method of nomograms.

As shown in the Tables, compounds III, VI and VIII applied into the soil before sowing are more effective than prometrine for some kinds of plants but they are less active than the standard when acting on garden radish (Table 2,4).

Narrow-selective herbicide III is particularly suitable for treatment of vegetating plants, which herbicide poorly depresses garden radish, wheat and oats (Table 3,4) but in a dose of 2 kg/ha it can successively be used on potato, tomatoes and cabbage. The above-stated compounds are practically not toxic for maize both when applied into the soil before sowing and when used for the treatment of vegetating plants.

Table 2

Phytotoxicity of s-triazine derivatives applied into soil

| Compound | Chemical name | Dose kg/ha | Decrease weight of green mass in % to control | | | | | |
|---|---|---|---|---|---|---|---|---|
| | | | garden radish | bean | sun flower | wheat | oats | maize |
| 1 | 2 | 3 | 4 | 5 | 6 | 7 | 8 | 9 |
| VI | 2-methoxy-4-isopropyl-amino-6-hydroxylamino-s-triazine | 1 | 0 | 23[x] | 12[x] | 30 | 29 | 5[x] |
| | | 2 | 26 | 76 | 30 | 33 | 59 | 0 |
| | | 5 | 95 | 90 | 56 | 83 | 82 | 33[x] |
| | | $ED_{50}$ | 3.3 | 1.6 | 4.8 | 3.0 | 1.8 | 8.3 |
| III | 2-methylthio-4-isopropylamino-4-6-N-methyl-hydroxylamino-s-triazine | 1 | 0 | 42 | 26 | 43 | 57 | 21 |
| | | 2 | 21 | 100 | 60 | 83 | 84 | 18[x] |
| | | 5 | 79 | 100 | 99 | 97 | 98 | 27[x] |
| | | $ED_{50}$ | 3.8 | 1.5 | 1.8 | 1.3 | 0.8 | — |
| IV | 2-methylthio-4-n propylamino-6-N-methyl-hydroxylamino-s-triazine | 1 | 16[x] | 26 | 20[x] | 10[x] | 22[x] | 20[x] |
| | | 2 | 26 | 24 | 27 | 16[x] | 53 | 20[x] |
| | | 5 | — | 48 | 66 | 63 | 95 | 38 |
| | | $ED_{50}$ | 6 | 6 | 4.5 | 4.3 | 1.9 | 8.2 |
| II | 2-methylthio-4-iso-propylamino-6-hydroxylamino-s-triazine | 1 | 11[x] | 31 | 3[x] | 23 | 28 | — |
| | | 2 | 37 | 50 | 19[x] | 30 | 60 | 0 |
| | | 5 | — | 97 | 56 | 73 | 96 | 43 |
| | | $ED_{50}$ | 4 | 2 | 4.8 | 3 | 1.5 | 6 |
| VIII | 2-methoxy-4-isopropyla-mino-6-N-ethylhydroxy-lamino-s-triazine | 1 | 42 | 7[x] | 0 | 75 | 64 | 0 |
| | | 2 | 53 | 69 | 10 | 94 | 82 | 0 |
| | | 5 | 98 | 98 | 70 | 100 | 98 | 28 |
| | | $ED_{50}$ | 2 | 1.8 | 4 | <1 | <1 | >5 |
| VII | 2-methoxy-4-ethylami-no-6-N-ethylhydroxy-lamino-s-triazine | 1 | 0 | 0 | 0 | 0 | 16[x] | — |
| | | 2 | 0 | 0 | 0 | 30 | 36 | 0 |
| | | 5 | 33 | 26 | 10 | 75 | 87 | 16[x] |
| | | $ED_{50}$ | >5 | >5 | >5 | 3.2 | 2.5 | >5 |
| | Atrazine | 1 | 99 | 50 | 35 | 98 | 91 | 0 |
| | | 2 | 100 | 100 | 100 | 100 | 98 | 0 |
| | | 5 | 100 | 100 | 100 | 100 | 100 | 0 |
| | | $ED_{50}$ | <0.5 | 1 | 1.2 | <0.5 | <0.5 | — |
| | Prometrine | 1 | 5[x] | 21[x] | 0 | 12[x] | 0 | 9[x] |
| | | 2 | 31 | — | 0 | 71 | 38 | 14[x] |
| | | 5 | 84 | 92 | 27[x] | 100 | 86 | 50 |
| | | $ED_{50}$ | 2.6 | 1.8 | >5 | 1.7 | 2.5 | 5 |

[x] The decrease in weight of the green mass of plants has not been proved mathematically.

Table 3

Phytotoxicity of s-triazine derivatives sprayed onto plants

| Compound | Chemical title | Dose kg/ha | Decrease in weight of green mass in % to control | | | | | |
|---|---|---|---|---|---|---|---|---|
| | | | garden radish | bean | sun flower | wheat | oats | maize |
| 1 | 2 | 3 | 4 | 5 | 6 | 7 | 8 | 9 |
| VI | 2-methoxy-4-isopropyl-amino-6-hydroxylamino-s-triazine | 1 | 30 | 36 | 12 | — | — | 0 |
| | | 2 | 43 | 53 | 18 | 29 | 26 | 0 |
| | | 5 | 57 | 75 | 43 | 90 | 50 | 0 |
| | | $ED_{50}$ | 3.5 | 1.8 | 6.4 | 3 | 5.4 | 0 |
| II | 2-methylthio-4-isopropylamino-6-hydroxylamine-s-triazine | 1 | 20[x] | 64 | 47 | — | 32 | 0 |
| | | 2 | 29 | 76 | 82 | 49 | 71 | 0 |
| | | 5 | 59 | — | 92 | 81 | 78 | 0 |
| | | $ED_{50}$ | 4.5 | 1 | 1.1 | 2.2 | 1.8 | — |
| VIII | 2-methoxy-4-isopropyl-amino-6-N-ethylhydroxylamino-s-triazine | 1 | 19 | — | — | 15[x] | 8[x] | 4[x] |
| | | 2 | 35 | 56 | 27[x] | 46 | — | — |
| | | 5 | 64 | 67 | 60 | 54 | 27[x] | 6[x] |
| | | $ED_{50}$ | 3 | <2 | 3.8 | 4.4 | >5 | >5 |
| VI | 2-methoxy-4-ethylamino-6-N-ethylhydroxylamino-s-triazine | 1 | 0 | 0 | 0 | 6[x] | 0 | 0 |
| | | 2 | 10[x] | 26[x] | 7 | 15[x] | 0 | 0 |
| | | 5 | 29[x] | 30 | 29 | 17 | 0 | 0 |
| | | $ED_{50}$ | >5 | >5 | >5 | >5 | — | — |
| III | 2-methylthio-4-isopropylamino-6-N-methylhydroxyl-amino-s-triazine | 1 | 20[x] | — | 88 | 0 | 33 | 13[x] |
| | | 2 | — | 55 | 84 | 11[x] | — | 16[x] |
| | | 5 | 73 | 61 | 100 | 61 | 81 | 21[x] |
| | | $ED_{50}$ | 2.4 | 0.8 | <0.5 | 3.5 | 2 | >5 |
| | Atrazine | 1 | 100 | 90 | 100 | 75 | 96 | 0 |
| | | 2 | 100 | 100 | 100 | 97 | 100 | 0 |
| | | 5 | 100 | 97 | 100 | 100 | 100 | 13 |
| | | $ED_{50}$ | <0.5 | <0.5 | <0.5 | 0.4 | <0.5 | >5 |
| | Prometrine | 1 | 90 | 74 | 96 | 63 | 81 | 0 |
| | | 2 | 97 | 91 | 100 | 83 | 100 | 24[x] |
| | | 5 | 100 | 100 | 100 | 92 | 100 | 43 |
| | | $ED_{50}$ | <0.5 | 0.5 | <0.5 | 0.7 | 0.5 | >5 |

[x] A reduction in weight of the green mass of the plants has not been proved mathematically.

Table 4

Phytotoxicity of s-triazine derivatives

| Compound | $ED_{50}$ in kg per ha (by reduction of weight or green mass of plants in % to control) | | | | | |
|---|---|---|---|---|---|---|
| | garden radish | bean | sun flower | wheat | oats | maize |
| Soil application of preparations | | | | | | |
| VI | 3.3 | 1.6 | 4.8 | 3.0 | 1.8 | 8.3 |
| VIII | 3.8 | 1.5 | 1.8 | 1.3 | 0.8 | — |
| IV | 6 | 6 | 4.5 | 4.3 | 1.9 | 8.2 |
| II | 4 | 2 | 4.8 | 3 | 1.5 | 6 |
| VIII | 2 | 1.8 | 4 | <1 | <1 | >5 |
| VII | >5 | >5 | >5 | 3.2 | 2.5 | >5 |
| Atrazine | <0.5 | 1 | 1.2 | <0.5 | <0.5 | — |
| Prometrine | 2.6 | 1.8 | >5 | 1.7 | 2.5 | 5 |
| Spraying preparations onto plants | | | | | | |
| VI | 3.5 | 1.8 | 6.4 | 3.0 | 5.4 | — |
| II | 4.5 | <1 | 1.1 | 2.2 | 1.8 | — |
| VIII | 3 | <2 | 3.8 | 4.4 | >5 | >5 |
| VII | >5 | >5 | >5 | >5 | — | — |
| III | 2.4 | 0.8 | <0.5 | 3.5 | 2 | >5 |
| Atrazine | <0.5 | <0.5 | <0.5 | 0.4 | <0.5 | >5 |
| Prometrine | <0.5 | 0.5 | <0.5 | 0.7 | 0.5 | >5 |

EXAMPLE 4

Cultivated plants (21 species) and weeds (22 species) are grown in paper cups and clay flower-pots from seeds or vegetative organs (rootstocks) to 10 or 20-day age and are treated with a water suspension of compounds III and VI in doses of 2 and 5 kg/ha. Prometrine and atrazine are used as a standard. After 30 days the herbicide properties of the compounds are evaluated by the reduction in the weight of the green mass on the cultivated plants (Table 6) and by observing the weeds (Table 7).

As seen from the Tables, compounds III and VI feature an original selectivity of the herbicide action advantageous as compared with the standard.

The following cultivated plants are stable to the action of compound III in a dose of 2 kg/ha: pea, soybean, cucumbers, melon, pumpkin, millet, maize, coriander, carrot, lettuce, potato, tomatoes; in a dose of 5 kg/ha: pumpkin, millet, cabbage, maize, carrot, potato. Pumpkin, lettuce, millet and carrot are stable to com-

Table 5

Phytotoxicity of compound III as compared with prometrine and atrazine in the process of treatment of vegetating plants

| Preparations | Doses, kg/ha | Reduction of weight of green mass in % with reference to control | | | | | | | | | | | |
|---|---|---|---|---|---|---|---|---|---|---|---|---|---|
| | | Sorghum | soybean | flax | carrot | potato | tomatoes | | beet | pea | cabbage | | cucumbers | buckwheat |
| | | | | | | | 2 real leaves | seedlings (6 leaves) | | | 2 real leaves | seedlings (6 leaves) | | |
| III | 2 | 0 | 70 | 100 | 68 | 0 | 90 | 0 | 91 | 49 | 52 | 0 | 100 | 79 |

Table 5—Continued

Phytotoxicity of compound III as compared with prometrine and atrazine in the process of treatment of vegetating plants

| Prepa-rations | Doses, kg/ha | Sor-ghum | soy-bean | flax | car-rot | po-tato | tomatoes 2 real leaves | seed-lings (6 leaves) | beet | pea | cabbage 2 real leaves | seed-lings (6 leaves) | cu-cum-bers | buck-wheat |
|---|---|---|---|---|---|---|---|---|---|---|---|---|---|---|
| Atrazine | 5 | 0 | 88 | 100 | 92 | 66 | 100 | 0 | 100 | 56 | 80 | 0 | 100 | 100 |
| | 2 | — | 99 | 56 | 42 | 20 | 94 | — | 100 | 87 | 95 | — | 100 | 100 |
| | 5 | — | 100 | 92 | 80 | 100 | 100 | — | 100 | 88 | 100 | — | 100 | 100 |
| Prometrine | 2 | — | 100 | — | — | — | — | — | — | 100 | 100 | — | 100 | — |
| | 5 | — | 100 | — | — | — | — | — | — | 100 | 100 | — | 100 | — | pound VI in a dose of 5 kg/ha, while atrazine taken in the above doses suppreses all these cultures, except for millet and maize, for 40-100%, whereas prometrine does not make damage only to pea, pumpkin and maize. The efficiency of compounds III and VI in the action on weeds are comparable with the standards for the most of the tested species of plants (Table 7).

EXAMPLE 5

Compound III in the form of solution in acetone either is applied into soil prior to planting out seedlings of white-head cabbage and tomatoes and to seeding of some species of weeds or the cabbage and tomatoes plants are treated with a solution of compound III in an alcohol-dioxane mixture (noted in Example 2) 2 weeks

TABLE 6

PHYTOTOXICITY OF SOME HYDROXYLAMINE DERIVATIVES OF S-TRIAZINE ON CULTIVATED PLANTS IN CASE OF PREEMERGENCE SOIL APPLICATION

| | | Cabbage | | Tomatoes seedlings 6 developed leaves | | | | | | | | | | | | Garden straw-berry | | |
|---|---|---|---|---|---|---|---|---|---|---|---|---|---|---|---|---|---|---|
| Compound | Dose, kg/ha | 3rd developed leaf | Seedlings 4–5 real leaves | | Buckwheat | Pea | Soybean | Flack | Cucumbers | Melon | Pumpkin | Millet | Coriender | Carrot | Lettuce | | Potato | Red beet |
| VI | 2 | 15 | ˣ12 | ........... | ˣ13 | ˣ9 | ˣ20 | 26 | ˣ21 | 30 | 0 | 0 | 44 | 0 | 0 | ........... | | 62 |
| | 5 | 28 | 45 | ........... | 58 | ˣ23 | ˣ23 | 46 | 72 | 81 | ˣ11 | ˣ7 | 78 | ˣ9 | 52 | ........... | | 93 |
| III | 2 | 0 | 0 | ˣ12 | 35 | ˣ13 | ˣ3 | 41 | ˣ10 | 0 | 0 | 0 | ˣ18 | 0 | 0 | 60 | 0 | ˣ10 |
| | 5 | 28 | 0 | 31 | 100 | 27 | ˣ20 | 79 | 78 | 55 | ˣ14 | ˣ19 | ˣ27 | 0 | 65 | 100 | 0 | 93 |
| Atrazine | 2 | ........... | ........... | ........... | 100 | ˣ14 | 51 | 78 | 89 | 100 | ˣ41 | ˣ2 | ˣ22 | 59 | 86 | 89 | 75 | 100 |
| | 5 | ........... | ........... | ........... | 100 | 81 | 100 | 95 | 100 | 100 | 100 | 31 | 78 | 95 | 100 | 100 | 88 | 100 |
| Prometrine | 2 | ........... | 51 | ........... | 100 | 0 | 36 | 55 | ˣ11 | 40 | ........... | ........... | 0 | ˣ32 | 53 | 86 | 75 | 90 |
| | 5 | ........... | 100 | ........... | 100 | ˣ20 | 57 | 93 | 74 | 67 | ˣ15 | ........... | 0 | 45 | 65 | 100 | 88 | 100 |

ˣ Reduction in weight of the green mass of the plants has not been proved mathematically.

Table 7

Herbicide activity of compound III as compared with prometrine in case of postemergence application on weeds (in dose of 2 kg/ha)

| Item No. | Name of weeds | Phase of development in moment of treatment | Compound III | Prometrine |
|---|---|---|---|---|
| 1 | 2 | 3 | 4 | 5 |
| 1. | Greater plantain (Plantago major) | 2-3 developed leaves | (+) | +(+) |
| 2. | White goosefoot (Chenopodium album) | 2-4 developed leaves blooming | +++ +++ | +++ +++ |
| 3. | Knotweed (Polygonum lapathifolium L.) | 3 developed leaves | +++ | +++ |
| 4. | Wild buckweed (Polygonum convolvulus L.) | 5-6 developed leaves | +++ | + |
| 5. | Knotgrass (Polygonum aviculare L.) | 6-8 developed leaves | ++(+) | ++(+) |
| 6. | Sheep sorrel (Rumex acetosella L.) | 3-4 developed leaves | +++ | +++ |
| | Sheep sorrel (Rumex acetosella L.) | From rootstock 3-4 developed leaves | 0 | +(+) |

Table 7—Continued

Herbicide activity of compound III as compared with prometrine in case of postemergence application on weeds (in dose of 2 kg/ha)

| Item No. | Name of weeds | Phase of development in moment of treatment | Compound III | Prometrine |
|---|---|---|---|---|
| 1 | 2 | 3 | 4 | 5 |
| 7. | Field pennycress (Thlaspi arvense L.) | 2-4 developed leaves | ++(+) | +++ |
| 8. | Thorn-apple (Dature stramonium L.) | 2 developed leaves | +++ | +++ |
| 9. | Black hendane (Hyoscyamus niger L.) | 2-3 developed leaves | +++ | +++ |
| 10. | Dark mullein (Verbascum nigrum L.) | 3-4 developed leaves | +++ | +++ |
| 11. | Campion (Silene latifolia Rende et Brit) | 5-6 developed leaves | +++ | +++ |
| 12. | Gorn spurry (Spergula arvensis L.) | 2 whorls of 6 leaves each | +++ | +++ |
| 13. | Wild oats (Avena fatua) | 2-nd leaf | ++ | ++(+) |
| 14. | Common yarrow (Achillia millefolium L.) | 3-4 developed leaves | +++ | +++ |
| 15. | Cocklebur (Xanthium spinosum L.) | 3-4 developed leaves | ++(+) | +++ |
| 16. | Matricary (Matricaria matricarioidis) | 8-10 developed leaves, beginning of blooming | 0 (+) | + (+) |
| 17. | Creeping thistle (Cirsium arvense Scop.) | From rootstock 3-4 developed leaves | +(+) | + |
| 18. | Field sow thistle (Sonchus arvensis L.) | From rootstock 3-4 developed leaves | 0 | + |
| 19. | Mugwort (Artemisia vulgaris L.) | 4-5 developed leaves | +++ | +++ |
| 20. | Purple deadnettle (Lamium purpureum L.) | Blooming | +++ | +++ |
| 21. | Field mint (Meutha arvensis L.) | 4-6 developed leaves | ++(+) | ++(+) |
| 22. | Red hemp-nettle (Galeopsis ladanum) | 4-6 developed leaves | +++ | +++ | after the planting, while the weeds are treated 2 weeks after the seeding. A month after the beginning of the test the preparation index $ED_{20}$ is determined for each culture (a dose of herbicide reducing the weight of the green mass of the culture for 20 percent) and preparation index $ED_{80}$ for each species of the weeds (a dose of herbicide reducing the weight of the green mass of the weeds by 80 percent). Prometrine and semerone, which is used in practice for cabbage, were employed as standards.

The test has shown (Table 8) that compound III is less toxic for cabbage that semerone.

TABLE 8

Indices $ED_{20}$ for cultures and $ED_{80}$ for weeds of 2-methylthio-4-isopropylamino-6-N-methyl hydroxylamino-s-triazine (compound III)

| Item No. | Name of culture or weed | No. of compound or name of preparation | $ED_{20}$ of culture | $ED_{80}$ of weed | $ED_{20} \pm$ | $ED_{80} \pm$ |
|---|---|---|---|---|---|---|
| 1 | 2 | 3 | 4 | 5 | 6 | 7 |
| | | Treatment of vegetating plants | | | | |
| 1. | Wild oats | Semerone | — | 4.5 | — | 4.4 – 4.6 |
| 2. | Wild oats | III | — | 4 | — | 3.9 – 4.1 |
| 3. | Wild oats | Prometrine | — | >10 | — | — |
| 4. | Drooping brome | III | — | 1.9 | — | 1.87-1.94 |
| 5. | Drooping brome | Prometrine | — | 0.66 | — | 0.61-0.72 |
| 6. | Couch grass | III | — | 4 | — | 3.8-4.3 |
| 7. | Couch grass | Prometrine | — | >10 | — | — |
| 8. | Couch grass | Semerone | — | 0.94 | — | 0.92-0.98 |
| 9. | Barnyard grass | Prometrine | — | 0.56 | — | 0.55-0.57 |

TABLE 8 – Continued

Indices $ED_{20}$ for cultures and $ED_{80}$ for weeds of 2-methylthio-4-isopropylamino-6-N-methyl hydroxylamino-s-triazine (compound III)

| Item No. | Name of culture or weed | No. of compound or name of preparation | $ED_{20}$ of culture | $ED_{80}$ of weed | $ED_{20}$ ± | $ED_{80}$ ± |
|---|---|---|---|---|---|---|
| 1 | 2 | 3 | 4 | 5 | 6 | 7 |
| 10. | Barnyard grass | III | — | 1.43 | — | 1.36–1.50 |
| 11. | Barnyard grass | Semerone | — | 2.5 | — | 2.43–2.58 |
| 12. | Wild camomile | III | — | 2 | — | 1.9–2.13 |
| 13. | Wild camomile | Prometrine | — | 0.34 | — | 0.33–0.35 |
| 14. | Wild camomile | Semerone | — | 0.15 | — | 0.14–0.16 |
| 15. | White goosefoot | Prometrine | — | 0.21 | — | 0.20–0.22 |
| 16. | White goosefoot | Semerone | — | 0.10 | — | 0.08–0.13 |
| 17. | White goosefoot | III | — | 0.80 | — | 0.76–0.86 |
| 18. | Cabbage | Prometrine | 2.2 | — | 2.17–2.24 | — |
| 19. | Cabbage | III | 10.1 | — | — | — |
| 20. | Cabbage | Semerone | 2.7 | — | 2.6–2.8 | — |
| 21. | Tomatoes | III | 10.0 | — | — | — |
| Soil application of herbicides | | | | | | |
| 22. | Wild oats | Prometrine | — | 1.45 | — | 1.37–1.55 |
| 23. | Wild oats | III | — | 1.24 | — | 1.15–1.35 |
| 24. | Wild oats | Semerone | — | 0.49 | — | 0.46–0.52 |
| 25. | Wild oats | Semerone | — | 0.9 | — | 0.86–0.96 |
| 26. | Couch grass | Prometrine | — | 0.52 | — | 0.51–0.53 |
| 27. | Couch grass | III | — | 1.45 | — | 1.40–1.52 |
| 28. | Amaranth | Semerone | — | 1.1 | — | 1.01–1.23 |
| 29. | Amaranth | Prometrine | — | 1.28 | — | 1.19–1.42 |
| 30. | Amaranth | III | — | 2.18 | — | 2.1–2.3 |
| 31. | Field pennycress | III | — | 4.7 | — | 4.1–5.4 |
| 32. | Field pennycress | Prometrine | — | 0.82 | — | 0.8–0.84 |
| 33. | Cabbage | III | 14.0 | — | — | — |
| 34. | Cabbage | Semerone | 2.8 | — | 2.72–2.87 | — |
| 35. | Cabbage | Prometrine | 0.78 | — | 0.71–0.86 | — |
| 36. | Tomatoes | III | 3.4 | — | 3.93–3.53 | — |

$ED_{20}$ of semerone for spraying of the plants is equal to 2.7 kg/ha, of compound III – 10.1 kg/ha. When the herbicides are applied into soil prior to introducing the seedlings, $ED_{20}$ of semerone for cabbage is equal to 2.8 kg/ha and of compound III – 14 kg/ha. Semerone is more toxic for weeds.

By using indices $ED_{20}$ of the preparation for cultures and $ED_{80}$ for weeds, the selectivity indices of the herbicides are determined. On spraying the plants, the selectivity indices of compound III are high — considerably higher than 2 (Table 9).

TABLE 9

Selectivity indices of 2-methylthio-4-isopropylamino-6-N-methylhydroxylamino-s-triazine as compared with prometrine and semerone in spraying the plants

| Cultures | Weeds | Compound III | Prometrine | Semerone |
|---|---|---|---|---|
| White-head cabbage (seedlings) | Wheat grass | 2.5 | <0.2*) | 2.9 |
| | Drooping brome | 5.8 | 3.3*) | — |
| | Wild oats | 2.5 | <0.2 | 0.7 |
| | Barnyard grass | 7.1 | 3.9 | 1.1 |
| | Matricary | 5.0 | 6.5 | 18.0 |
| | White goosefoot | 11.2 | 10.0 | 27.0 |
| Tomatoes (seedlings) | Wheat grass | 2.5 | | |
| | Drooping brome | 5.3 | | |
| | Wild oats | 2.5 | | |
| | Barnyard grass | 7.0 | | |
| | Matricary | 5.0 | | |
| | White goosefoot | 11.1 | | | x) For calculation of the selectivity index ED of wild oats and wheat grass is replaced by a dose of 10 kg/ha depressing the weight of green mass of these plants by at least 80%.

Semerone depresses dicotyledonous weeds more intensively than monocotyledonous weeds. Its selectivity index for cabbage relative to monocotyledonous weeds is not high. The same may be said about prometrine. Compound III is advantageous in that it has a high selectivity index for cabbage and tomatoes relative to barnyard grass, matricary and white goosefoot, which are often basic infestants of vegetable crops.

Thus, compound III is a highly selective herbicide on cabbage and tomatoes when spraying the plants 2 weeks after planting the seedlings. This compound, when applied into soil prior to the seedlings (Table 10) also has good selectivity indices relative to weeds.

TABLE 10

Selectivity indices of compound III applied into soil prior to sowing (planting) of cultures in comparison with selectivity indices of prometrine and semerone.

| Cultures | Weeds | Compound III | Prometrine | Semerone |
|---|---|---|---|---|
| White-head cabbage (seedlings) | Wheat grass | 11.6 | 1.5 | 3.1 |
| | Wild oats | 3.5 | 0.5 | 2.3 |
| | Field pennycress | 3.0 | 1.0 | — |
| | Amaranth | 6.4 | 0.6 | 2.5 |

As shown in Table 10, compound III is a highly selective herbicide on cabbage also when applied into soil prior to the seedlings.

EXAMPLE 6

Compound III in the form of water suspension of 40 percent wetting powder is applied into soddy podzolic loamy soil in a dose of 4 kg/ha on a trial plot. The area of the plot is equal to 5 m², the test is repeated five times. Prometrine was used as a standard (as a preparation of s-triazine herbicides quickly decomposing in a soil). 30, 60 and 100 days after the application of the preparations, average soil samples were taken from the working plot and residual amounts of the preparations in the samples were determined by the method of bioindication.

The experiments have shown that the inactivation of compound III during a period of 100 days is within 76 percent, while that of prometrine during the same period is 42 percent.

EXAMPLE 7

The primary evaluation of a number of hydroxylamine derivatives of formula I is effected by a somewhat modified method described in Example 2, among other things, on the following test-objects: oats, millet, bean, mustard. The treatment is effected by the preparations in the form of a water suspension of 40-per cent wetting powders or 40-per cent emulsion concentrate. The doses of the compounds are taken equal to 10 kg/ha. The treatment is carried out both prior to appearance of sproutings and during the vegetation of the plants into the phase of 2 or 3 leaves and further, as described in Example 2. The results of the herbicide action are expressed in per cent relative to control (Table 11).

The trials have shown that 2-methoxy-4-ethylamino-6-N-isopropylhydroxylamino-s-triazine (IX) and 2-methoxy-4-isopropylamino-6-N-isopropylhydroxylamino-s-triazine (X) are the most active preparations. They feature high herbicide activity both at preemergence application and at treatment of vegetating plants.

EXAMPLE 8

In a hothouse the Koch's dishes filled with earth are used for sowing 20–30 seeds of cultivated plants and weeds, thereafter, the soil surface is sprayed with a water suspension of compound IX taken in doses 1, 2.5 and 5 kg/ha. The procedure is repeated three times. 28 days after the appearance of the sprouting of the plants the weight of their green mass is calculated. During the vegetation other plants are treated in the phase of development of 2–3 leaves, the calculation being provided 28 days after the treatment. In doses of 2.5 and 5 kg/ha compound IX has shown total herbicide activity (Table 12). However, cotton plant under preemergence application of the herbicide in these doses was depressed only by 8 and 61 percent, while millet under postemergence application of the herbicide was depressed by 25 and 26 percent respectively. In a dose of 1 kg/ha the preparation in both modes of application completely destroyed mustard, flax, carrot, cabbage, beat, while oats and barley were destroyed by 50–75 percent. Cotton plant appeared stable to this dose of herbicide at preemergence application and millet was stable thereto at postemergence application. It is well known that cotton plant is very sensitive to atrazine and simazine. All the studied weeds, namely wild oats, barnyard grass, amaranth, knotweed, saltbush and camomile were completely destroyed by the preparation applied in the lowest test doses (1 kg/ha) under the premergence conditions (Table 13).

2-methoxy-4-ethylamino-6-N-butylhydroxylamino-s-triazine had a similar activity.

EXAMPLE 9

In similar tests compound X in a dose of 1, 2.5 kg/ha was practically harmless for cotton plant under the conditions of preemergence application and for millet under the conditions of postemergence application (Table 12).

The preparation had a total herbicide effect on weeds in a dose of 1 kg/ha at premergence application (Table 13). 2-methoxy-4-isoamylamino-6-N-ethylhydroxylamino-s-triazine acts similarly.

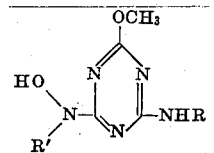

TABLE 11

| | | | Reduction of weight of green mass of plants in per cent, relative to control | | | | | | | |
|---|---|---|---|---|---|---|---|---|---|---|
| Compound | Chemical title | Dose in kg-ha | preemergence application | | | | treatment in vegetation | | | |
| | | | oats | millet | bean | mustard | oats | millet | bean | mustard |
| IX | 2-methoxy-4-ethyl-amino-6-N-isopropyl-hydroxylamino-s-triazine | 10 | 97 | 100 | 93 | 100 | 100 | 100 | 95 | 100 |
| X | 2-methoxy-4-isopropylamino-6-N-isopropylhydroxylamino-s-triazine | 10 | 91 | 100 | 84 | 100 | 100 | 100 | 95 | 100 |

TABLE 12

| Compound | Dose in kg/ha by active agent | Reduction of weight of green mass of plants in percent relative to control | | | | | | | | | | | | | | | | | | |
|---|---|---|---|---|---|---|---|---|---|---|---|---|---|---|---|---|---|---|---|
| | | Preemergence application | | | | | | | | | | Application during vegetation | | | | | | | | |
| | | Oats | Millet | Barley | Bean | Mustard | Flax | Carrot | Cabbage | Beet | Cotton | Oats | Millet | Barley | Bean | Mustard | Flax | Carrot | Cabbage | Beet | Cotton |
| IX | 5 | 100 | 100 | 100 | 100 | 100 | 100 | 100 | 100 | 100 | 61 | 98 | 26 | 100 | 100 | 100 | 100 | 100 | 100 | 100 | 95 |
| | 2.5 | 100 | 90 | 100 | 100 | 100 | 100 | 100 | 100 | 100 | 8 | 84 | 25 | 100 | 100 | 100 | 100 | 100 | 100 | 100 | 85 |
| | 1.0 | 75 | 50 | 78 | 78 | 100 | 68 | 100 | 100 | 100 | 9 | 77 | | 34 | 87 | 100 | 100 | 100 | 100 | 100 | 51 |
| X | 5 | 100 | 100 | 100 | 100 | 100 | 100 | 100 | 100 | 100 | 33 | 90 | 69 | 38 | 95 | 100 | 89 | 83 | 100 | 100 | 64 |
| | 2.5 | 94 | 71 | 92 | 100 | 100 | 100 | 100 | 100 | 100 | 10 | 59 | 2 | 22 | 77 | 100 | 84 | 38 | 84 | 93 | 33 |
| | 1.0 | 73 | 41 | 78 | 65 | 98 | 100 | 67 | 100 | 100 | 0 | 54 | 0 | 22 | 43 | 49 | 61 | 35 | 59 | 93 | 0 |

TABLE 13

| Compound | Dose in kg/ha | Reduction of weight of green mass of plants in % relative to control | | | | | | | | | | | |
|---|---|---|---|---|---|---|---|---|---|---|---|---|---|
| | | Preemergence application | | | | | | Application during vegetation | | | | | |
| | | Wild oats | Barnyard grass | Knotweed | amaranth | saltbush | matricary | wild oats | Barnyard grass | Knotweed | amaranth | saltbush | matricary |
| IX | 5.0 | 100 | 100 | 100 | 100 | 100 | 100 | 100 | 89 | 100 | 97 | 100 | 100 |
| | 2.5 | 100 | 98 | 100 | 100 | 100 | 100 | 93 | 61 | 98 | 93 | 100 | 100 |
| | 1.0 | 87 | 91 | 91 | 100 | 100 | 100 | 95 | 58 | 8 | 77 | 84 | 100 |
| X | 5.0 | 95 | 98 | 100 | 100 | 100 | 100 | 100 | 68 | 100 | 72 | 88 | 97 |
| | 2.5 | 90 | 98 | 100 | 100 | 100 | 100 | 47 | 52 | 62 | 44 | 85 | 97 |
| | 1.0 | 75 | 68 | 93 | 82 | 100 | 100 | 50 | 12 | 0 | 30 | 40 | 66 |

We claim:

1. A method of weed control which comprises applying to the area to be protected a herbicidally effective amount of a compound of the formula

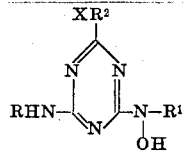

wherein R is alkyl of one to five carbon atoms;
R¹ is selected from the group consisting of hydrogen and alkyl of one to four carbon atoms;
R² is alkyl of one to two carbon atoms; and
X is selected from the group consisting of oxygen and sulfur.

2. A method of claim 1, in which said compound is 2-methylthio-4-isopropylamino-6-N-methylhydroxylamino-s-triazine.

3. A method of claim 1, in which said compound is 2-methoxy-4-ethlamino-6-N-isopropylhydroxylamino-s-triazine.

4. A method of claim 1, in which said compound is 2-methoxy-4-isopropylamino-6-N-isopropylhydroxylamino-s-triazine.

5. A method of claim 1, in which said compound is applied at a rate of from about 1 to about 2 kg/ha.

* * * * *